D. L. HOBBS.
STRAIN DISTRIBUTING ATTACHMENT FOR PLOWS.
APPLICATION FILED MAR. 30, 1915.
1,185,590.
Patented May 30, 1916.
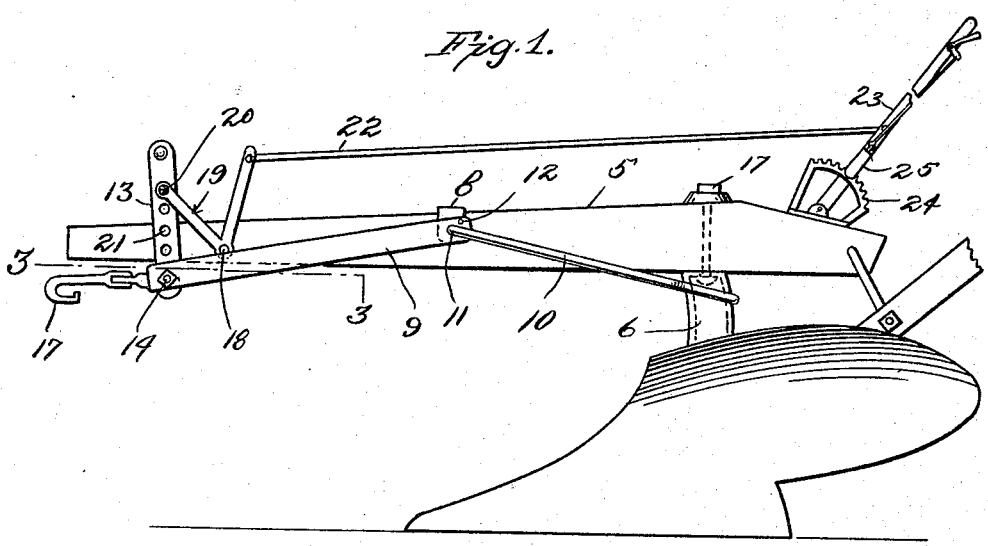
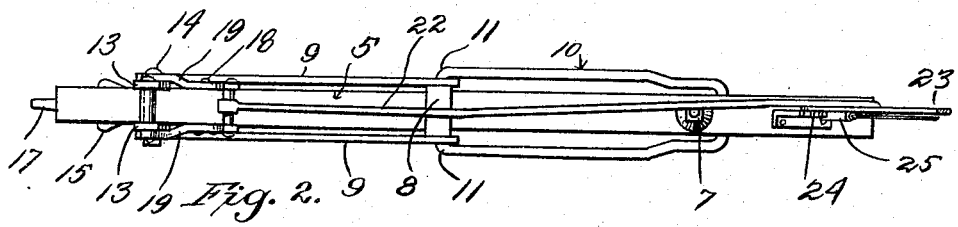
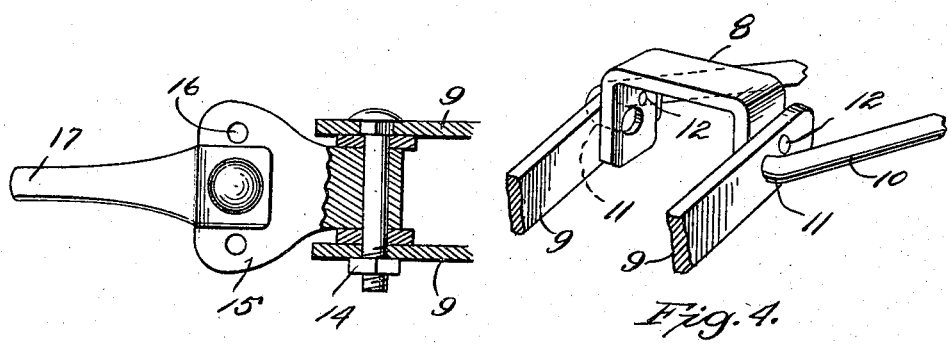
Inventor
D. L. Hobbs

UNITED STATES PATENT OFFICE.

DOSIA L. HOBBS, OF TROTVILLE, NORTH CAROLINA.

STRAIN-DISTRIBUTING ATTACHMENT FOR PLOWS.

1,185,590.  Specification of Letters Patent.  Patented May 30, 1916.

Application filed March 30, 1915. Serial No. 18,150.

*To all whom it may concern:*

Be it known that I, DOSIA L. HOBBS, a citizen of the United States, residing at Trotville, in the county of Gates, State of North Carolina, have invented certain new and useful Improvements in Strain-Distributing Attachments for Plows; and I do hereby declare the following to be a full, clear, and exact description of the invention, such as will enable others skilled in the art to which it appertains to make and use the same.

This invention relates to new and useful improvements in plow structures, and is particularly directed to the provision of means for relieving strain on the plow beam at the securing point of the plow stock thereto.

In ordinary plow structures, the plow beam is subjected to an excessive strain at the point of attachment of the plow stock thereto, and as the beam is necessarily weakened at this point by the attaching means for the plow stock there is a tendency for the beam to break at this point.

It is the object of the present invention to relieve this strain on this portion of the plow beam, and to so distribute the strain that no undue stress is exerted at any point, it being more specifically the object to provide such a strain distributing means wherein the plow beam may be readily adjusted with relation to the draft means as desired.

It is a further object to provide such a strain distributing means which may be readily associated with types of plows now in use, with but very little modification of the plow structure.

With the above and other objects and advantages in view, the invention resides more particularly in the novel combination, formation and arrangement of parts more fully hereinafter described and pointed out in the appended claims.

Reference is had to the accompanying drawings, wherein similar characters of reference designate corresponding parts throughout the several views, and in which:

Figure 1 is a side elevation of a plow with the improved strain relieving means associated therewith. Fig. 2 is a top plan view of the structure shown in Fig. 1, with the plow removed. Fig. 3 is a detail sectional view on the line 3—3 of Fig. 1, and Fig. 4 is a perspective view of the saddle portion of the device.

Referring now more particularly to the accompanying drawings, 5 designates the beam of an ordinary walking plow, and 6 the stock of the plow proper, which is secured to the beam by the usual bolt 7 passed vertically therethrough.

The improved means for distributing the torsional strain exerted on the plow stock by the plow comprises a yoke or saddle member 8 seated on and embracing the intermediate portion of the plow beam. Extending forwardly from this saddle at the sides of the beam are a pair of bars 9 with which is associated the draft means of the plow, and a rod 10 of elongated U shape has its bight portion engaged about the plow stock, and has the free ends of its arms directed inwardly at 11, and pivotally passed through the rear ends of the bars 9, and the sides of the saddle 8. The bars 9 are also secured to the saddle by bolts 12. Thus as the plow is drawn the bar 10 takes up the torsional strain of the plow stock, and this strain is exerted partly in a downward direction at the intermediate portion of the beam through the medium of the saddle 8, and partly in an upward direction at the forward ends of the bars 9 through the medium of certain clevis means on the bars. This clevis structure comprises a pair of substantially vertical bars 13 disposed at the sides of the forward end of the beam. Passed through the lower ends of these bars is a bolt 14 securing the forward ends of the bars 9. A horizontal clevis plate 15 is secured on the bolt between the bars and provided with a transverse series of openings 16 selectively receiving the draft hook 17.

Pivotally secured by the bolt 18 to the forward end of the plow beam are a pair of angle levers 19, each comprising a forwardly extending arm adjustably connected to the adjacent bar 13 by a bolt 20 passed therethrough, and through one of a series of openings 21 in the bar; and an upwardly extending arm pivotally connected to a link 22 extended to the rear portion of the plow beam, and pivoted to an operating lever 23 at said rear end. A rack bar 24 is carried on the rear end of the beam, and the lever 23 carries a conventional pawl 25 adapted to engage therewith. Thus means are provided which are operable from the operator's end of the plow beam to adjust the relation of the plow beam to the draft means and thus adjust the operation of the plow. As part of the strain exerted by the plow is imparted to the bolt 18, in an upward direction, this bolt is passed through the lower portion of the beam.

From the foregoing it is seen that a comparatively simple structure has been provided which will efficiently perform all of the functions set forth. The ease with which this structure may be associated with existing types of plows is obvious.

What is claimed is.

1. In a structure of the class described, the combination with a plow beam and plow stock secured thereto, of a saddle member on the intermediate portion of the beam, a bar secured to the saddle member and engaged with the stock, bars extending forwardly of the saddle, draft attaching means carried at the forward ends of the bars, and means carried by the beam for supporting the forward ends of said bars.

2. In a structure of the class described, the combination with a plow beam and plow stock secured thereto, of a saddle member on the intermediate portion of the beam, a bar secured to the saddle member and engaged with the stock, bars extending forwardly of the saddle, a clevis carried at the forward ends of the bars and adjustable means for supporting the forward ends of said bars from the plow beam.

3. In a structure of the class described, the combination with a plow beam and a plow stock secured thereto of a saddle member on the intermediate portion of the beam, a U-shaped rod engaged about the stock and having its ends pivotally engaged with the saddle, bars extending forwardly from the saddle, a clevis member carried at the forward end of said bars, bars extending upwardly from the said forward end, angle levers pivoted to the beam and to said upwardly extending bars, an operating lever on the beam and a link connecting the angle levers and the operating lever.

4. In a structure of the class described, the combination with a plow beam and plow stock secured thereto, of a saddle member on the intermediate portion of the beam, a U-shaped rod engaged about the stock and having its ends pivotally connected with the saddle, a bar extending forwardly and downwardly from the saddle on each side of the plow beam, a clevis member carried beneath the beam at the forward ends of said bars, a bar connected to and extending upwardly from the forward end of each of said bars, an angle lever pivoted on each side of the beam and detachably connected to the upwardly extending bars, an operating lever on the beam, and a link connecting the angle levers and the operating lever.

In testimony whereof, I affix my signature, in the presence of two witnesses.

DOSIA L. HOBBS.

Witnesses:
CHAS. E. RIORDON,
GEO. W. CHANDLER.